United States Patent [19]

Wenner et al.

[11] 4,035,765
[45] July 12, 1977

[54] THEFT ALARM FOR VEHICLE CARRIED RADIO EQUIPMENT

[75] Inventors: Lance E. Wenner, Lenexa; John R. Brassfield, Prairie Village, both of Kans.

[73] Assignee: Able Manufacturing Co., Inc.

[21] Appl. No.: 695,647

[22] Filed: June 14, 1976

[51] Int. Cl.$^2$ .............. B60R 25/10; G08B 13/22
[52] U.S. Cl. .............. 340/63; 307/10 AT; 340/276; 340/280
[58] Field of Search .............. 340/63, 276, 253 B, 340/280, 64, 65; 180/114; 307/10 AT; 325/117, 312

[56] References Cited
U.S. PATENT DOCUMENTS

| | | | |
|---|---|---|---|
| 2,686,909 | 8/1954 | Poulson | 340/276 |
| 2,935,730 | 5/1960 | Procter | 340/63 |
| 3,423,747 | 1/1969 | Hogencamp | 340/280 |
| 3,696,378 | 10/1972 | Daniel | 340/280 |
| 3,794,989 | 2/1974 | Manley et al. | 340/280 |

*Primary Examiner*—John W. Caldwell
*Assistant Examiner*—James J. Groody
*Attorney, Agent, or Firm*—Gordon D. Schmidt

[57] ABSTRACT

A theft alarm is provided for use in conjunction with vehicular mounted radio equipment, such as the popular but too frequently stolen citizens' band transceivers, which is responsive to either physical separation of the equipment being protected from the common electrical ground provided by the chassis of the vehicle or disconnection from such equipment of the cable by which it is normally coupled with an antenna mounted on the same vehicle. In order to permit locating and/or coupling the alarm circuit components with the equipment at points remote from the latter, so that the alarm portion of the system may be in a protected location or its presence not revealed by "extra" wires leading directly to the equipment or both, and in order that the alarm may function reliably and immediately in response to an attempted theft without adversely affecting the transmission of radio frequency signals between the equipment and the antenna and without possible impairment of the functioning of the alarm due to spurious electrical paths, the cable for connecting the equipment to the antenna is electrically separated into two sections at a zone intermediate its length, at which zone each conductor of one section is capacitatively coupled with the corresponding conductor of the other section, and the alarm controlling circuit is then coupled between the common ground and one of the conductors of the section of the antenna cable electrically adjacent to the equipment to be protected.

3 Claims, 1 Drawing Figure

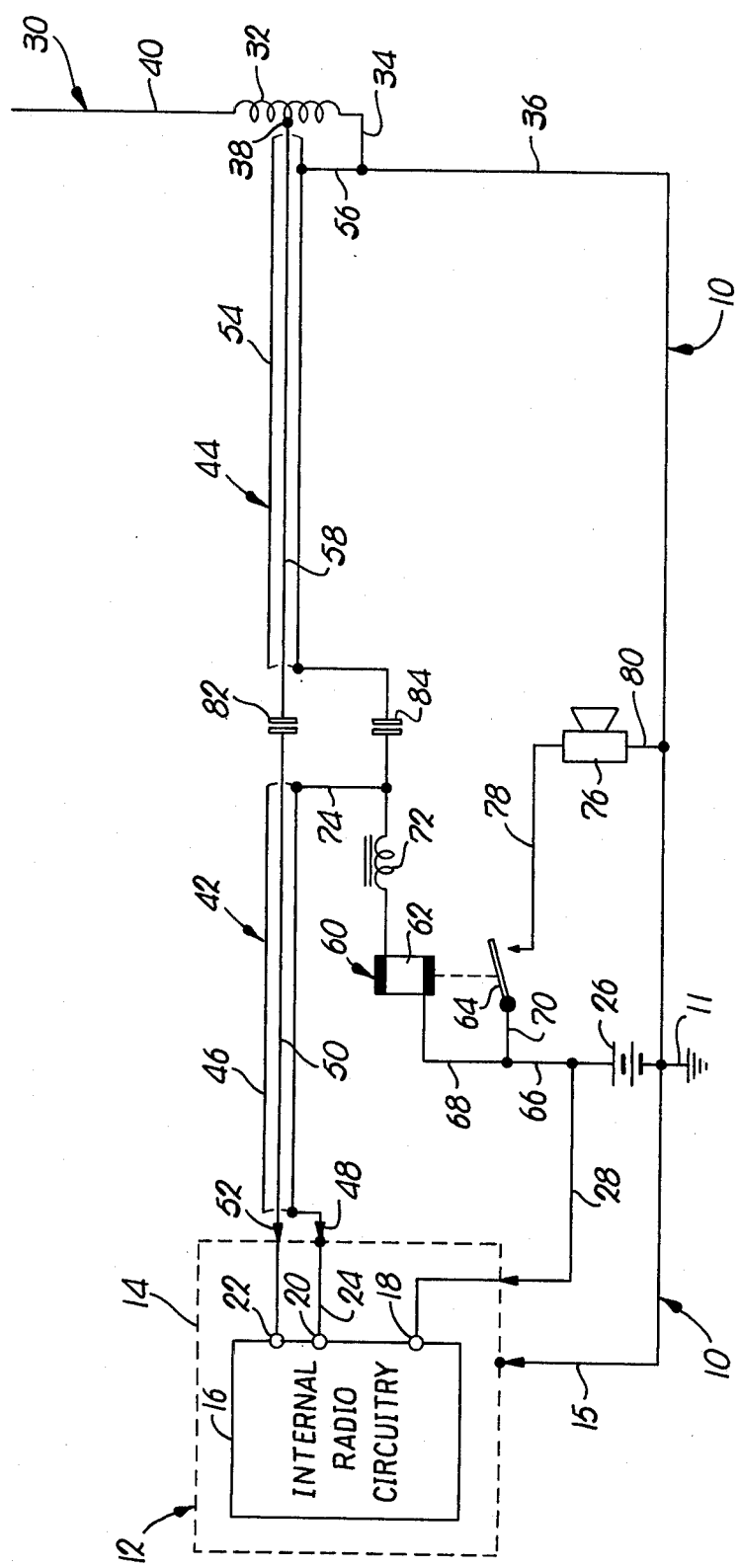

THEFT ALARM FOR VEHICLE CARRIED RADIO EQUIPMENT

This invention relates to electrical alarm circuitry and, more particularly, to an improved theft alarm system for use in protecting vehicle carried radio equipment and especially such equipment of the type that is commonly mounted on or below the dashboard of the vehicle such as citizens' band transceivers.

The unfortunate frequency with which such equipment is being stolen from the atuomobiles or trucks in which it is installed, while the owner is absent from the vehicle, has created a serious need for protective anti-theft alarm systems for such equipment, of a type that will be conveniently usable and installable in vehicles, that is not only reliable in operation but also simple, virtually maintenance free and economical to produce in the quantities required to satisfy the need, and that will not interfere with the operation of the radio equipment itself. It is also highly desirable in such an alarm system that it not be of a nature, for example, requiring obviously "extra" electrical connections to the radio equipment which would surely forewarn potential thieves of the presence of an alarm system and invite efforts by such persons to defeat the alarm system by any easily accomplished "bridging" of electrical paths critical to the operation of the alarm system with "jumper wires" or the like.

With vehicle mounted radio equipment of the kind employing the metal chassis of the vehicle as a "ground plane" for the antenna being employed, which is the case for a large portion of the currently popular citizens' band radio transceiver installations, it has been difficult to associate with such equipment suitable anti-theft alarm means of the desired simplicity and low cost, without either interfering with the operation of the equipment in performing its intended function of handling radio frequency signals or "building in" to the overall system serious limitations upon reliability of operation, if not an actual susceptibility of the system to having its alarm function defeated by the presence of spurious direct current electrical paths or simple "jumpering" by a potential thief or both. In an attempt to overcome such difficulties, the prior art devices of which we are aware have either resorted to alarm systems of unnecessary complexity and cost or have compromised the practical effectiveness of the alarm function by employing "extra" leads and connections to the main radio equipment unit of nature that will obviously forewarn a potential thief of the presence of an alarm system and invite the defeating of the latter by expedients which may be obvious even to relatively unsophisticated potential thieves.

Accordingly, it is the primary object of this invention to overcome the aforementioned difficulties and limitations experienced with prior systems for the same general purpose, and to provide an improved alarm system of the type mentioned which will be reliable in operation as well as economical for both the producer and the user.

Additional more specific objects of the invention, including important aspects of the construction preferably to be employed, will be made clear or become apparent from our preferred embodiment of our invention, as shown in the accompanying drawing and as described in greater detail hereunder.

In the accompanying drawing, the single FIGURE thereof is an electrical schematic diagram showing our currently preferred embodiment of our invention, in which it will be noted that the components and electrical paths illustrated relate to those which may be deemed essential to the primary function of the radio equipment portion of the system and to the association with the latter of the portion of the system providing the alarm function, but that internal details of the radio equipment itself and other components and connections of the electrical system of the vehicle itself, which do not form a part of the present invention, are omitted for clarity of illustration and explanation.

Referring now to the drawing, the electrically conductive means generally indicated by the reference numeral 10, which is shown as grounded as at 11, will be understood to represent the common reference ground provided by the chassis of the vehicle itself, which also electrically constitutes the "ground plane" for the antenna hereinafter described as associated with the radio equipment to be protected.

The radio equipment to be protected, which may be a transmitter, a receiver or a transceiver, is generally indicated at 12 in the drawing and will be understood to include an outer, predominantly metallic, electrically conductive housing 14 which, when normally installed in the vehicle, will be grounded to the common reference ground 11 through an electrical path 15 that normally is provided merely by the engagement and securement of the housing 14 with some part of the vehicle chassis 10. The internal electrical circuitry of the equipment 12, the exact nature of which is not significant to the present invention, is represented in the drawing by a block 16. It may be noted, however, that the radio circuitry 16 conventionally includes a direct current power input terminal 18 for receiving the electrical power required for operation of the internal circuitry 16, a ground terminal 20 required for connection to the other side of the operating power source and also normally constituting one of the two terminals, the other being illustrated at 22, by which the internal circuitry 16 of the radio equipment 12 is to be coupled with an antenna. At this juncture it should also be observed that the terminal 20, which is common to the power supply to the circuitry 16 and the radio frequency coupling with the antenna later to be described, is connected by electrically conductive means 24 with the conductive housing 14 internally of the latter.

The source of electrical power for operating the radio equipment 12 as well as the alarm portion of the system to be described will commonly and most conveniently be provided by the storage battery 26 already present and forming a part of the elelctrical system of the vehicle, although a separate battery or equivalent power source could, of course, be employed if desired. It will be seen that the power connections from the battery 26 to the internal circuitry 16 of the radio equipment 12 are effected from the ungrounded terminal of the battery 26 to the power input terminal 18 of the circuitry 16 through a conductive lead 28, and from the grounded terminal of the battery 26 to the common terminal 20 of the circuitry 16 via a path traceable through the vehicle chassis 10, the electrical contact 15 of the chassis 10 with the housing 14, the conductive housing 14 itself and the conductive means 24.

The antenna assembly associated with the system is generally designated 30 and conventionally includes an inductive loading coil 32 whose lower end is physically mounted upon and thereby electrically coupled with the chassis 10 of the vehicle, as indicated by the conductive path 34, 36 in the drawing. The coil 32 is provided with an intermediate tap 38 to be electrically coupled with the antenna terminal 22 of the radio circuitry 16 for transfer of radio frequency signals therebetween, and it may also be observed that the lower grounded end of the coil 32 is to be electrically coupled with the common terminal 20 of the circuitry 16 for the same purpose and in order that the vehicle chassis 10 may act as a "ground plane". The antenna element proper, which is shown at 40, will conventionally be provided by an electrically conductive rod or "whip" extending upwardly from the upper end of the coil 32, which is both physically mounted upon and thereby electrically connected with the latter.

In prior, conventional radio equipment installations in vehicles, the terminals 20 and 22 of the circuitry 16 or their equivalents, will be respectively connected with the lower end of coil 32 and the tap 38 of the latter by a continuous, dual conductor, electrical cable assembly, which is most often of the coaxial type. For reasons hereinafter more fully explained, however, the cable means employed in the present invention for effecting the mentioned coupling for the passage of radio frequency signals between the circuitry 16 of the equipment 12 and the antenna assembly 30 employs a pair of successive cable sections 42 and 44, which are significantly electrically intercoupled in a particular way, as later explained. For the moment, however, it should be noted that the cable section 42 electrically adjacent the radio equipment 12 has a first (or outer, in a coaxial type cable) conductor 46 releasably elelctrically connected with the common terminal 20 of the circuitry 16 by means of a portion 48 of a conventional plug and socket (or equivalent connector) provided upon the housing 14 and the adjacent end of the cable section 42, while the other (or inner) conductor 50 of the cable section 42 is coupled with the antenna terminal 22 of the circuitry 16 through another portion 52 of the mentioned, conventional plug and socket arrangement. Similarly, the first (or outer) conductor 54 of the cable section 44 is connected to the lower end of the coil 32 by conductive means 56, while the other (or inner) conductor 58 of the cable section 44 is connected with the tap 38 of the coil 32.

The simplest and most positively reliable type of alarm system for detecting the removal of an object having an electrically conductive path therethrough involves the provision of a control circuit including such conductive path through the object, which includes a sensing component that will normally remain in a standby condition as long as electrical continuity exists throughout the control circuit, but which component will immediately alter its state to a different, alarm actuating condition whenever the electrical continuity of the control circuit is interrupted, as by the breaking of the conductive path provided by the object upon the physical removal of the latter. In our currently preferred embodiment of our invention, we favor the employment of the simplest and most economical type of alarm system components available and thus employ a relay generally designated 60 having an operating coil 62 and a single pole, single throw relay switch 64 that is open when the coil 62 is energized, as is contemplated to be the normal or standby condition of the alarm control circuit in our system. As will be readily apparent from the drawing, the ungrounded terminal of the battery 26 is connected with one terminal of the coil 62 through conductive means 66 and 68 and with one terminal of the switch 64 through conductive means 68 and 70. The other terminal of the coil 62 is connected through a radio frequency choke 72 and conductive means 74 with one conductor of the cable section 42, with our preference being, as illustrated in the drawing, to make this connection to the conductor 46 of the cable section 42 because of the ease of the connection when the cable section 42 is of the coaxial type. As those skilled in the art will appreciate, the series choke 72 is employed merely to provide radio frequency isolation for the radio signals being carried by the cable section 42, while preserving the desired continuity of the control circuit for direct current flow.

The mentioned alarm control path may thus be traced from the ungrounded terminal of the battery 26 through the conductive means 66 and 68, the relay coil 62, the radio frequency choke 72, the conductive means 74, the conductor 46 of the cable section 42, the connector portion 48, a conductive path through the housing 14, the contact 15 between the housing 14 and the vehicle chassis 10 and a path through the chassis 10 to the grounded terminal of the battery 26. As will be apparent, as long as the continuity of that control path is preserved, the relay coil 62 will remain energized, thereby holding the relay switch 64 in its open, standby position. However, it will be further observed that, if either the connection of the conductor 46 of the cable section 42 through the antenna connector protion 48 to the housing 14 or the electrical contact 15 of the housing 14 with the vehicle chassis 10 is interrupted, the relay coil 62 will be immediately de-energized for lack of a complete circuit path back to the grounded terminal of the battery 26, thereby forthwith causing the relay switch 64 to close.

Consider, however, what would occur if one attempted to employ this simple and effective type of alarm condition sensing arrangement to a vehicle mounted radio equipment installation in which a single continuous cable was employed for interconnecting the terminals 20 and 22 of the radio circuitry with the antenna assembly 30, that is, a cable in which the equivalent of the conductors 46 and 54 were merely portions of the same conductor or directly interconnected and the equivalent of the conductors 50 and 58 were similarly just parts of the same conductor or directly interconnected with each other. It may be confirmed by reference to the drawing, with such change in the cable means assumed, that the operation of the simple alarm condition sensing structure would be inherently defeated by the existence of an alternate, spurious electrical path for maintaining the energization of the relay coil 62 traceable from the upper terminal of the latter through the choke 72 and the conductive means 74 to the assumedly integral or directly interconnected cable conductor 46–54, thence through the conductive means 56 and 36 and the vehicle chassis 10 back to the grounded terminal of the battery 26. With such an arrangement, the relay coil 62 would remain continuously energized and the relay switch would remain continuously in its open standby position regardless of whether or not the housing 14 of the radio equipment and thereby the circuitry 16 had been completely disconnected from all other parts of the system and physically removed from the vehicle. Apparently, this is the reason that prior devices have either resorted to much more complex, expensive and failure-prone types of alarm circuitry or have employed at least one, obviously "extra" conductive lead separated from the usual antenna and power connections to the equipment 12 running from the relay coil 62 to the housing 14 to provide for the required control path, but unfortunately doing so in a manner that not only warns the prospective thief of the presence of an alarm system but practically tells him how to defeat it.

Before proceeding to an explanation of how we have discovered the noted problem may be conveniently and effectively solved, it should be observed that the relay switch 64 is employed to actuate, when it is closed, any suitable type of alarm indicating mechanism. In our preferred embodiment, we employ an audible warning device 76, which could be specially provided in the vehicle as a part of the warning system, but which we prefer for reasons of economy and minimization of installation requirements to provide by merely utilizing the horn already provided in the vehicle as a part of its standard equipment. Obviously, where the alarm indicator 76 is merely the horn of the vehicle, as we prefer, there will be other connections thereto within the electrical system of the vehicle itself for operation of the horn 76 from the button or the like provided for that purpose on the steering wheel of the vehicle, which components and connections we have omitted since they form no part of our invention. The connections required to the horn 76 for the purposes of our alarm system include merely conductive means 78 connecting one terminal of the horn 76 with the contact of the relay switch 64 and, if it is not already a part of the electrical system of the vehicle, a grounding connection 80 from the other terminal of the horn 76 to the vehicle chassis 10.

We have found that the solution to the problem resides in employing the two separate cable sections 42 and 44 and further employing capacitors 82 and 84 for respectively capacitively intercoupling the cable conductor 50 with the cable conductor 58 and the cable conductor 46 with the cable conductor 54. The electrical interposition of the capacitors 82 and 84 between the cable sections 42 and 44, provided that such capacitors 82 and 84 are of substantially equal capacitance value, does not interfere with or materially adversely affect the transmission line characteristics of the composite cable means 42, 82, 84 and 44 for effectively carrying radio frequency signals between the circuitry 16 of the radio equipment 12 and the antenna assembly 30. However, the presence of the capacitors 82 and 84 is found to block or interrupt the continuity for direct current flow of spurious direct current paths which would otherwise defeat the effective operation of the favored, simple type of alarm condition sensing circuitry that we employ, including the spurious path previously traced for a hypothetical single cable installation and, perhaps, still others that might exist with particular types of commercial antenna assemblies 30.

Through the employment of the radio frequency signal passing, direct current flow blocking capacitors 82 and 84, the advantage of being able to employ one of the conductors (46, as illustrated) of the cable section 42 as a part of the alarm control circuit is achieved. This, in turn, especially since the cable section 42 may be of any desired reasonable length, permits the connection 74 from the relay coil 62 to the cable section 42 to be made at a location which may be quite remote from the physical location of the radio equipment 12 and its housing 14. For example, if desired, the relay 60 and choke 72 may be located under the hood of the vehicle or even in the normally locked trunk thereof so as to be either in a more protected location or at least in a less conspicuous location than if they or a separate "extra" lead therefrom had to be intimately asociated with the housing 14. In this regard, it will be observed that the employment of a conductor of the cable section 42 and the vehicle chassis 10 itself as what may constitute the portions of the alarm control circuit having the greatest lengths provides great flexibility with respect to the locations in which the components of the alarm portion of the system may be located during installation in varying types of vehicles having differing locations for the antenna assembly 30.

As those skilled in the art will perceive, certain minor modifications or changes could be made from the exact details of construction disclosed to illustrate our currently preferred embodiment of our invention without departing from the real gist or essence thereof. Accordingly, it should be understood that the invention should be deemed limited only by the fair scope of the claims that follow, including mechanical equivalents thereof.

We claim:
1. For use in combination with:
a vehicle having an electrically conductive chassis providing a local, electrical, ground reference;
an electrical direct current power source carried by said vehicle and having a pair of power terminals of which one is electrically connected with said ground reference;
electrically actuatable horn means carried by said vehicle and having a pair of energizing terminals of which one is electrically connected with said ground reference;
radio equipment means normally carried by said vehicle and having a ground terminal normally electrically connected with said ground reference when said equipment means is being carried by said vehicle, and a pair of antenna terminals of which one is electrically connected with said ground terminal of said equipment means; and
antenna means carried by said vehicle and having a pair of connection terminals of which one is electrically connected with said ground reference;
apparatus for operatively coupling said antenna terminals of said equipment with said connection terminals of said antenna means and for providing a theft alarm to protect said equipment means against unauthorized removal from said vehicle by providing an alram indication whenever said ground terminal of said equipment means is electrically disconnected from said ground reference, said apparatus including:
first cable means having a pair of electrical conductors respectively releasably electrically connected adjacent one end of said first cable means with said antenna terminals of said equipment means;
second cable means having a pair of electrical conductors respectively electrically connected adjacent one end of said second cable means with said connection terminals of said antenna means;
a relay having a coil provided with a pair of operating terminals of which one is electrically connected with the other of said power terminals and the other of which is electrically coupled with one of said conductors of said first cable means, said relay including a switch which is open when said coil is energized and closed when said coil is deenergized and having a pair of switch terminals of which one is electrically connected with said other power terminal and the other of which is electrically connected with the other of said energizing terminals of said horn means;

first electrical coupling means adjacent the other ends of said first and second cable means for electrically coupling the other conductor of said first cable means with one conductor of said second cable means; and second electrical coupling means adjacent the other ends of said first and second cable means comprising a capacitor interconnected between said one conductor of said first cable means and the other conductor of said second cable means for electrically intercoupling said cables for radio frequency signals while maintaining direct current isolation between said other operating terminal of said coil and said other conductor of said second cable means, whereby said one conductor of said first cable means is employed both as a part of the radio frequency signal transmission line between said equipment means and said antenna means and as a part of the alarm controlling circuit without impairment of either function thereof by the other.

2. The invention of claim 1, wherein said first electrical coupling means comprises another capacitor interconnected between said other conductor of said first cable means and said one conductor of said second cable means.

3. The invention of claim 2, wherein said capacitors are of substantially equal capacitance to maintain the transmission line balance between the conductors of said first and second cable means for radio frequency signals.

* * * * *